United States Patent
Dawson et al.

(10) Patent No.: US 9,526,994 B2
(45) Date of Patent: Dec. 27, 2016

(54) DEFERRED TELEPORTATION OR RELOCATION IN VIRTUAL WORLDS

(71) Applicant: International Business Machines Corporation, Armonk, NY (US)

(72) Inventors: Christopher J. Dawson, Arlington, VA (US); Rick Allen Hamilton, II, Charlottesville, VA (US); Robert C. McGinley, Olympia, WA (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 13/906,517

(22) Filed: May 31, 2013

(65) Prior Publication Data

US 2013/0268870 A1    Oct. 10, 2013

Related U.S. Application Data

(63) Continuation of application No. 12/547,792, filed on Aug. 26, 2009, now abandoned.

(51) Int. Cl.
*G06N 5/02* (2006.01)
*A63F 13/87* (2014.01)
(Continued)

(52) U.S. Cl.
CPC ............. *A63F 13/87* (2014.09); *A63F 13/795* (2014.09); *G06F 3/04815* (2013.01);
(Continued)

(58) Field of Classification Search
None
See application file for complete search history.

(56) References Cited

U.S. PATENT DOCUMENTS 6,751,655 B1    6/2004  Deutsch et al.
2004/0228531 A1  11/2004  Fernandez et al.
(Continued)

FOREIGN PATENT DOCUMENTS

EP    1 689 143 A1    8/2006

OTHER PUBLICATIONS

Symantec, Symantec Mail Security Administration Guide, Symantec, 2006, pp. 1-249.*
(Continued)

*Primary Examiner* — Wilbert L Starks
(74) *Attorney, Agent, or Firm* — Whitham, Curtis & Cook, PC; Maeve M. Carpenter

(57) ABSTRACT

A user of a virtual universe system is provided with the option of deferring a response to an invitation for an avatar to be relocated (including relocation by performing a teleportation operation) by providing for selective storage of received invitations in a queue with a priority determined based on one or more rules which can preferably be developed by conversion from an invitation. Status of issuers of invitations can be monitored or the issuers polled and the current status can be displayed to a user to determine actions to be taken in manipulating priority in the queue. The user is also provided with the capability of editing priority of stored invitations including the ability to accept, reject or forward the invitation or convert the invitation to a landmark. Invitations having similarities may be grouped in accordance with any desired metadata contained in the invitation. Rules can also be set from the virtual universe system independently of a user in regard to priority and thus provides a new form of advertising.

21 Claims, 12 Drawing Sheets

(51) Int. Cl.
*A63F 13/795* (2014.01)
*G06Q 30/02* (2012.01)
*G06F 3/0481* (2013.01)
*A63F 13/61* (2014.01)
*A63F 13/5372* (2014.01)

(52) U.S. Cl.
CPC .......... *G06Q 30/02* (2013.01); *A63F 13/5372* (2014.09); *A63F 13/61* (2014.09); *A63F 2300/306* (2013.01); *A63F 2300/556* (2013.01); *A63F 2300/572* (2013.01); *G06N 5/02* (2013.01)

(56) References Cited

U.S. PATENT DOCUMENTS

2006/0242639 A1 10/2006 Manion et al.
2007/0123353 A1 5/2007 Smith

OTHER PUBLICATIONS

Berger, Manon of Second Life: Teaching in the Virtual World, Essay, Technology and Culture, Project MUSE: Scholarly Journals Online, Society for the History of Technology, 2008, pp. 430-441.*
Symantec; "Symantec Mail Security Administration Guide"; Symantec, 2000, pp. 1-249.
Berger; "Manon of Second Life: Teaching in the Virtual World"; Technology and Culture; Project MUSE: Scholarly Journals Online; Society for the History of Technology, 2008, pp. 430-441.
Neustaedter et al.; "Capturing and Sharing Memories in a Virtual World"; CHI 2009, pp. 1-10.
Greenhill; "Do We Remove All Walls? Second Life Librarianship"; The Australian Library Journal, 2008, pp. 377-393.

* cited by examiner

*Figure 7*

Add New Teleport Priority

⦿ Friend/Agent Priority    Friend/Agent List  [Tom Smith / Joe Abraham ▽]

◯ Anyone

◯ System Group    System Preference  [IBM System Admin / IBM AIX Admin Group ▽]

◯ Keyword in Description    Keyword  ['System Error' ▽]

┌─ Enter Text ──────────────────────┐
│ ⦿ Accept this invitation on arrival │
│ ◯ Reject this invitation on arrival │
└──────────────────────────────────┘

[ OK ]   [ Cancel ]

*Figure 8*

DEFERRED TELEPORTATION OR RELOCATION IN VIRTUAL WORLDS

FIELD OF THE INVENTION

The present invention generally relates to the production and management of interactive virtual universes presented to users on computers linked by a network and, more particularly, to administration of requests/invitations for teleportation or relocation of avatars directed to users.

BACKGROUND OF THE INVENTION

Closely following the introduction of computer generated graphic representations of objects, computers games have been developed and have become popular to the point of becoming a significant industry. A significant factor in the continuing popularity of such games may possibly be the fact that the simulated venue or environment in which the game is played is limited only by the imagination of the game developer and can be presented to a viewer on a display with a realistic appearance which is limited only by the hardware and software employed to render associated images. Moreover, such simulated environments may be changed at will and very rapidly with rules of the game often being altered with the simulated environment. Connection of computers through networks such as the Internet have also allowed interactive participation in the same game simultaneously or at will by numerous participants.

As a synthesis of such games with other capabilities of the Internet such as interactive chat rooms, advertising and marketing and access to massive amounts of information and the like, so-called virtual universes (sometimes referred to as "metaverses" or "3D Internet") have been developed and made available to the public in recent years. A virtual universe (VU) is a computer-based simulated environment intended for users thereof (referred to as "residents" or "agents") to inhabit, traverse and interact through the use of avatars. An avatar, in the context of a VU, is a graphical representation of a user which has an appearance that is freely selectable that the user can control and other participants can see, often taking the form of a cartoon-like human which can move through the regions of the virtual universe represented by 3D graphics and landscapes. Such 3D graphics and virtual landscapes may or may not resemble the real world in terms of physical laws, building environments, geography and landscapes. Some examples of virtual universes available to the public include Second Life® ("Second Life" is a trademark of Linden Research, Inc. in the United States and/or other countries), Entropia Universe™ ("Entropia Universe" is a trademark of Mindark PE AB in Sweden and/or other countries), and There® ("There" is a trademark of Forterra Systems, Inc. in the United States and/or other countries). Examples of massively multiplayer online games include EverQuest® ("EverQuest" is a trademark of Sony Online Entertainment, LLC in the United States and/or other countries), Ultima Online® ("Ultima Online" is a trademark of Electronic Arts, Inc. in the United States and/or other countries) or World of Warcraft World of Warcraft® ("World of Warcraft" is a trademark of Blizzard Entertainment, Inc. in the United States and/or other countries). Publically available virtual universes and/or massively multiplayer online games are operated by persons or companies who provide servers to generate portions of the VU and which may impose a charge for participation as a resident, to establish a particular object or environment (sometimes referred to as an "island") within the VU, present advertising and the like or combinations thereof.

In short, an avatar controlled by a resident can interact with other avatars, objects and portions of the immediate environment of the avatar in much the same way a person would interact with other persons, objects and portions of the environment in the real world, but where transportation or relocation of an avatar between portions of the VU may be nearly instantaneous (e.g. referred to as "teleporting") and objects and local environments within the VU may be entirely developed at will to resemble the real world closely, not at all or with any degree of realism or fantasy in between which may be provided by the administrator of the VU or users of the VU, often for a not insubstantial fee.

A user may relocate a corresponding avatar to any location or island of which the user may be aware or may find during a search; maintaining locations of particular interest as "landmarks" which are largely similar to "bookmarks" on the internet. To increase such knowledge and provide for communication or shared experiences with other users, through their avatars, invitations can also be issued by a user to relocate or teleport their avatar to particular locations. However, as the use of virtual universes becomes more popular, notifications to users of the issuance of such invitations, usually accomplished using a pop-up window, can be numerous to the point of causing interference with the virtual universe experience of the invitation recipient while some invitations may require an immediate response.

SUMMARY OF THE INVENTION

It is therefore an object of the present invention to provide a system for managing teleportation/relocation invitations, particularly to accommodate needs and preferences of a user.

In order to accomplish these and other objects of the invention, a method is provided for performing or causing performance of steps of logically analyzing an incoming teleportation invitation on the basis of at least the sender and proposed teleportation location, and responsive to results of said logically analyzing step, automatically performing one of accepting the invitation, rejecting the invitation, and deferring response to the invitation by placing the invitation in a queue at a queue location having a priority based on the logical analysis.

In accordance with another aspect of the invention, a virtual universe systems provided including comparators for comparing metadata in an invitation to a plurality of rules, storage for containing a queue of the invitations, an arrangement for storing an invitation in the queue with a priority determined in accordance with a rule, and an arrangement for manipulating priority of teleportation invitations, accepting and invitation or rejecting an invitation stored in said queue whereby an invitation may be deferred.

In accordance with a further aspect of the invention, a method of advertising using a virtual universe system is provided including steps of logically analyzing an invitation in accordance with a rule, deferring response to the invitation by storing the invitation in a queue with a priority specified in a rule from the virtual universe system.

In accordance with yet another aspect of the invention, a computer program product is provided comprising a computer readable medium or a communication link supplying signals comprising a computer program, said computer program, when run on a computer, causing said computer to perform: logically analyzing an incoming teleportation invitation on the basis of at least the sender and proposed teleportation location; and responsive to results of said logically analyzing step, automatically performing one of: accepting the invitation, rejecting the invitation, and deferring response to the invitation by placing the invitation in a queue at a queue location having a priority based on said logically analyzing step.

BRIEF DESCRIPTION OF THE DRAWINGS

The foregoing and other objects, aspects and advantages will be better understood from the following detailed description of a preferred embodiment of the invention with reference to the drawings, in which:

FIG. 7 is a preferred dialog box or interface screen for forwarding invitations and splitting groups of invitations, FIG. 8 is a dialog box or interface screen for adding new teleport invitation prioritization rules.

DETAILED DESCRIPTION OF A PREFERRED EMBODIMENT OF THE INVENTION

Figure 1:
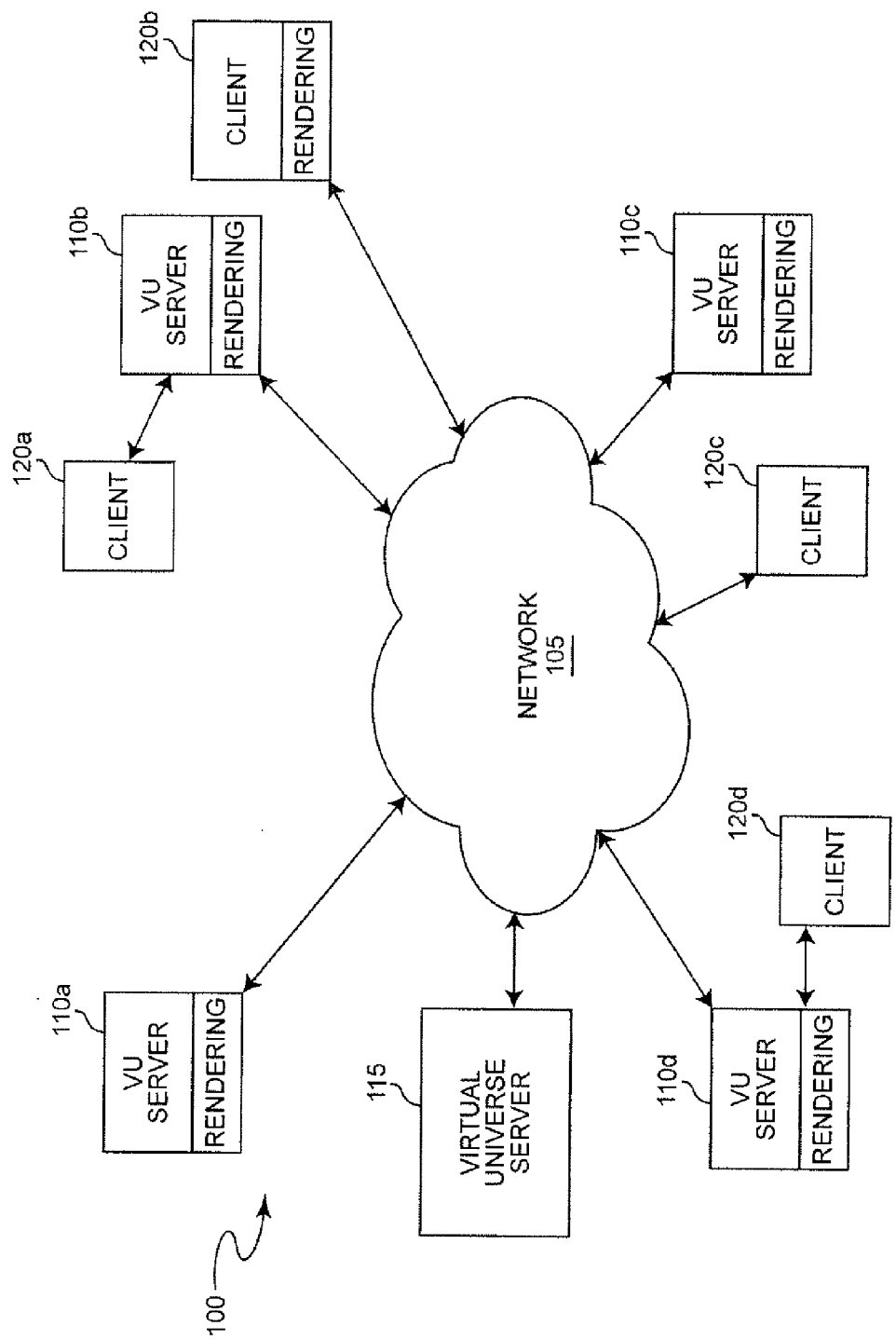
FIG. 1 is a high-level block diagram or data flow diagram of a network-based virtual universe.
Figure 2:
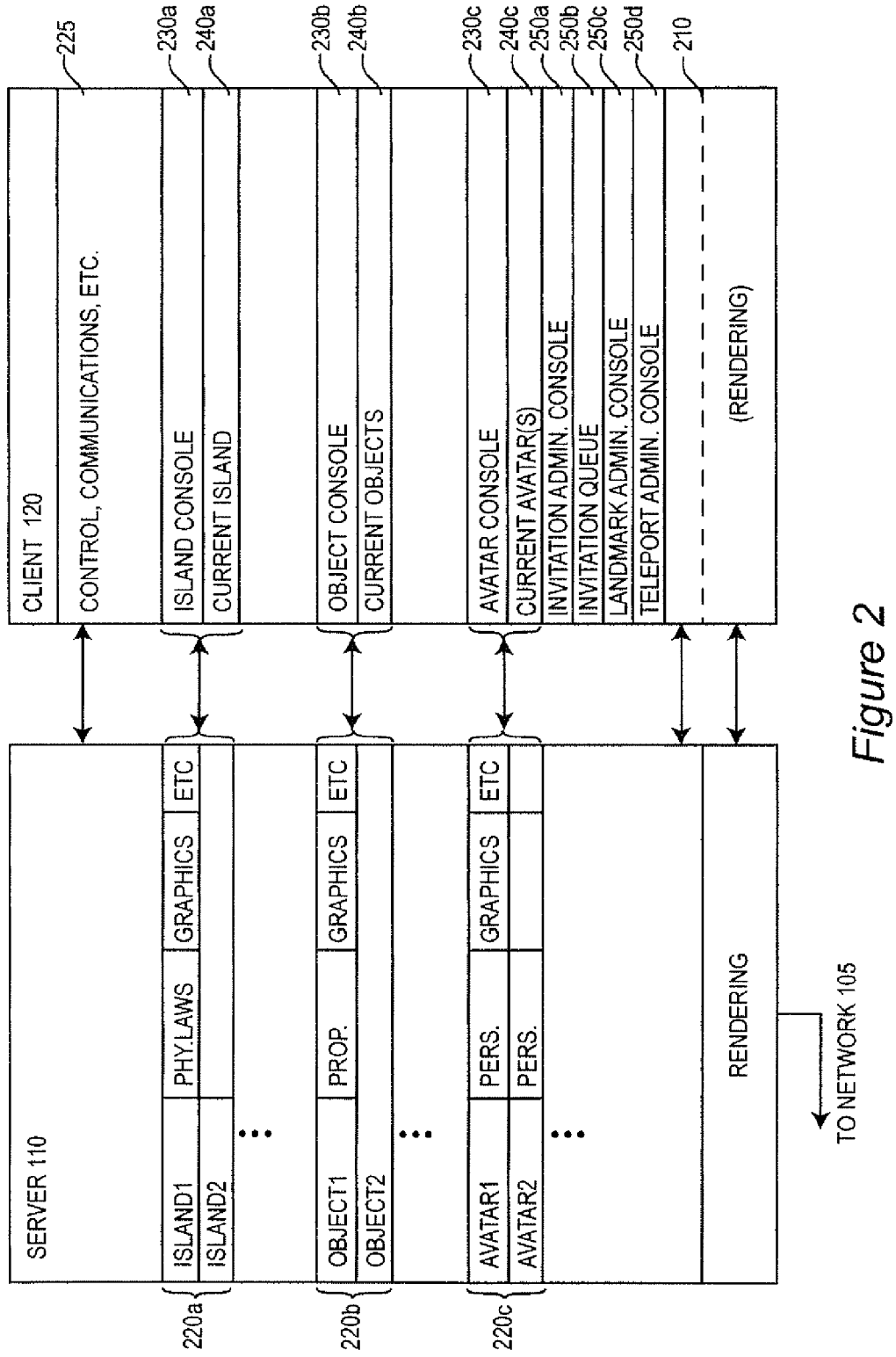
FIG. 2 is a similarly high-level block diagram of some details of the client 120 and server 110 generally provided for participation in a virtual universe.

Referring now to the drawings, and more particularly to FIG. 1, there is shown a high-level diagram of a network implementing a virtual universe (VU). FIG. 2 is a similarly high-level block diagram illustrating functional relationships between a client terminal and a server implementing a VU and between which network 105 may or may not be interposed. FIGS. 1-2 are principally arranged to facilitate an understanding of the overall general operation of a virtual universe and do not and are not intended to represent any particular known implementation of a VU. Further, at the level of abstraction with which a VU is represented in FIG. 1, the VU illustrated may or may not include the invention and no portion of FIG. 1 or 2 is admitted to be prior art in regard to the invention. It should also be borne in mind that VU implementations have become relatively sophisticated and the underlying technology relatively mature such that enhancements thereto, such as those provided by the present invention, must be interoperable with existing network and VU infrastructure.

It should also be recognized that operation of a VU is extremely processing intensive and, while large amounts of computing resources may be accessible through a network, graphics generation and rendering must be distributed and managed in such a way as to provide images of portions of the VU in a very short period of time in order to be acceptable to residents of the VU, particularly in regard to updating views as avatars are manipulated and as teleportation between islands of the VU occur. Further, substantial portions of the control of avatars must be automated in order to keep the manipulation effort required of a resident within reasonable bounds while providing meaningful and reasonably logical and realistic interactions with environments, objects and other avatars. Thus, each environment/island, object and avatar must be personalized (e.g. have a personality, properties, including ownership and the like) as well as many properties and attributes (e.g. behaviors and defaults) which must be transmitted efficiently, generally as metadata, between potentially a large number of processors which perform the rendering thereof and the rendering distributed in some form to the terminals through which residents interact with the VU.

More specifically, as illustrated in FIG. 1, the overall network and system 100 will be recognized as substantially the same as that of the Internet. Other functional elements such as firewalls, proxies and the like may be included for purposes of security, reliability and the like but are not important to the successful practice of the invention. Network 105, such as the Internet, provides communications between all VU servers 110a-110d and at least one virtual universe server 115 which establishes the basic VU topology, characteristics, rules and the like and maintains membership and billing information in regard to residents (users). Clients 120a-120d are essentially user terminals and may communicate with the network 105 and VU server 115 either directly or through a VU server although that distinction is unimportant to the practice of the invention, as well.

In the following discussion, the term "rendering" will be used to denote the entirety of processing performed on the definitions of landscapes, environmental features, avatars and/or objects as contained in metadata in order to produce signals which can be used to drive a display to produce a graphical image. Such processing will, for example, include projection of the location of an object in the virtual environment to a location in a two-dimensional representation from a particular viewing point, positioning and orienting geometric coordinates of graphic primitives approximating environment features, objects or avatars or parts thereof, making hidden line calculations, generating surface textures, generating lighting and shading effects and their interactions between objects and the like to construct a scene and, as such, constitutes a substantial processing burden. As a practical matter in view of current communications bandwidth constraints, distribution of processing power and storage over a network, hardware and software compatibility and issues of data transmission delays and latency, some aspects of scenes are usually constructed at a server and transmitted over the network as positions, graphics primitives and geometric coordinates (sometimes referred to as a pre-image) while hidden line and surface computations, generation of textures, lighting and shading effects and the like for final image presentation (which are well-developed and routine processes that can be performed on relatively inexpensive hardware such as a graphics card) are generally performed on such hardware in a client processor. However, the location where the rendering process or portions thereof are performed is not important to the practice of the invention while the critical aspect of rendering for VU performance is the overall processing load the entire process imposes on a VU system, particularly when teleportation is performed.

Referring now also to FIG. 2 the nature of communications generally depicted in FIG. 1 will be explained in greater detail but also with a degree of generality since many variations thereof may be employed. It will be readily understood by those skilled in the art that rendering of islands, avatars, objects and the like is perhaps the most processing intensive aspect of a virtual universe as well as being the most time-critical for performance which is acceptable to the user. Hardware, software and firmware for performing a convenient portion of rendering is generally resident in each VU server 110 and the virtual universe server 115 but may be present to some degree (e.g. a graphics co-processor) at a client terminal 120 as depicted by dashed line 210 and parentheses in FIG. 2. In general, the servers 110, 115 will have the capability of arbitrating the most convenient/available location for the portion of the rendering performed on a server to be done most expeditiously. For example, when a rendering of a scene is required at, for example, client 120*a* for interaction of a particular avatar with an object while changing location on an island, the rendering (including occlusion or hidden line processing) could be performed at the client, local server 110*b* or distributed over any or all of servers 110*a*-110*d* And possibly even including some client terminals (e.g. 120*b*) having rendering capability depending on rendering complexity (e.g. required detail) and current processing loads of VU servers and clients. It should be appreciated that plural avatars for plural residents/users may be present in the same environment and that a different point of view may be required for the rendering presented to each resident/user.

Thus, the graphics to be presented to a user may be transmitted as a rendering or partial rendering to the network or a local client from a server (e.g. as primitives and geometric coordinates or even compressed video or graphics primitives which may or may not be further modified at a local server or client processor) or, if rendering of avatars, objects or islands resident on a particular server are to be performed on another processor, attributes such as the identity, physical laws, graphics definitions (e.g. primitives), etc. of an island, the identity, properties, graphics definitions, etc. of an object and/or personality, ratings, graphics definitions, etc. of an avatar are stored, preferably as metadata in servers 110 and transmitted as such to the processor which will actually perform the rendering and retransmission of the graphics. It should be appreciated that such attributes will be either constant or only infrequently or slowly changing and thus would be impractical and distracting to specify with each avatar command but can be automatically transmitted and retransmitted between servers automatically, as needed, with avatar commands, controls and/or communications specified by the user/resident.

It should also be appreciated that client 120 will have appropriate controls and communications facilities (which are not generally hardware-dependent but can use available hardware interfaces such as a keyboard, mouse, camera, microphone or the like) collectively depicted at 225 of FIG. 2 which will preferably be resident on the client processor. In order to create islands, objects and avatars, some arrangement for doing so, preferably a graphic user interface (GUI) which may be in the form of one or more screens (possibly nested) functioning as a console 230*a*-230*c* may also be resident but are preferably downloaded from virtual universe server 115 through the local server. Such consoles allow particular attributes (e.g. locations, properties, personalities, graphics definitions and the like) to be specified and which are thereafter stored, preferably on an associated server 110 as depicted at 220*a*, 220*b* and 220*c* for islands, objects and avatars, respectively. Similar GUIs 240*a*-240*c* are also provided (but preferably resident on the client processor) for control of the current island, object and/or avatar, once it has been created. Suitable arrangements for providing GUIs or consoles 230*a*-230*c* and GUIs 240 are known and others providing enhanced user/resident convenience is foreseeable. The current island (220*a*) with its associated objects (220*b*) correspond to the current location of the current avatar (220*c*) and are thus the object of teleportation or relocation invitations to which the present invention is directed for management thereof as will now be discussed.

Some definitions which will be helpful in the following discussion are:

1. Avatar—an avatar is a graphical representation the user/resident selects that others can see, often taking the form of a cartoon-like human but which can be produced with any degree of detail, whether real or fanciful;

2. Agent—an agent is the user's account, upon which the user/resident can build an avatar and which is tied to an inventory of assets the user creates and/or owns;

3. Region—a region is a virtual area of land (e.g. a portion of an island or an environment associated therewith, such as an interior space in a building) within the virtual universe which typically resides on a single server;

4. Landmarks—a landmark is a map location that can be saved by a user and typically comprises a name and a map coordinate within the VU;

5. Friend/contact—a friend or contact is another user/resident of the VU which is maintained in one or more lists which allows a user to see when friends or prior contacts are online and provides a mechanism for contacting them directly using tools available with the list. It should also be appreciated that assets, avatars, the environment corresponding to a location and anything else visible in the virtual environment comprises universal unique identifiers (UUIDs) tied to geometric data (preferably distributed to users as textual coordinates), textures (preferably distributed to users as graphics files such as JPEG 2000 files) and effects data (preferably rendered by the user's client according to the user's preferences and user's device capabilities but could be otherwise rendered as discussed above).

Virtual universes may be traversed by such methods as walking, flying or teleporting. Generally, walking and flying provide for traversal of areas within an island while teleporting provides a mechanism to travel rapidly from one VU location to another VU location even if the locations are geographically (e.g. in the context of the topology of a particular VU) far apart or even in different virtual universes. As indicated above, a user can teleport to any other location of which he may be aware. However, since a major feature of virtual universes is to allow avatars of different users to interact as well as to increase user awareness of additional locations that may be of interest, one user may issue an invitation to another user in the form of an offer of teleporting an avatar of the recipient from the current location of the recipient's avatar to another location. Known systems allow a recipient to accept or reject the invitation/offer of teleporting. If accepted, the avatar of the recipient is teleported from its current location to a location corresponding to the invitation/offer.

As alluded to above, a VU may be quite busy at any given time with possibly thousands of users and friends logged on at any given time. Therefore, it is likely that any given user may receive many invitations for teleportation with relatively high frequency. Since such an invitation may involve both a particular issuing user (who may or may not be a previous friend or contact) and a location (with which the recipient user may or may not be familiar), immediate acceptance may not always be desirable and some consideration of whether to accept or reject a particular invitation may be desirable but may, nevertheless, present an undesirable interruption to the recipient user. Additionally, the use of pop-up windows as a typical, known form of alerting the recipient user of an invitation may clutter the user's screen and distract from or even preclude the recipient user's current activity. Therefore, users may desire the additional choice of deferring an invitation to a more appropriate time as well as a less intrusive method of being alerted to the issuance of an invitation; a facility which is not currently available in the art but is provided by the present invention. Further, there is no currently available arrangement for prioritizing or otherwise administering invitations. In this regard, prioritization is particularly important in business applications where teleport invitations may represent system event notifications which may require immediate attention of the recipient/user while others may be entirely discretionary or unrelated to the business application. That is, in addition to the present capability of accepting or rejecting invitations, additional capabilities of deferring acceptance or rejection of invitations, saving and prioritizing the deferred invitations in a queue which may also be reordered by a user, and forwarding an invitation to another friend or user are thus desirable. Further, the ability to set up default priorities based on invitation senders and invitation type or invitation location which may be administered in accordance with particular rules (which may be automatic or managed by an agent to reduce the need for users to actively set up priorities) may also be desirable.

Figure 3:
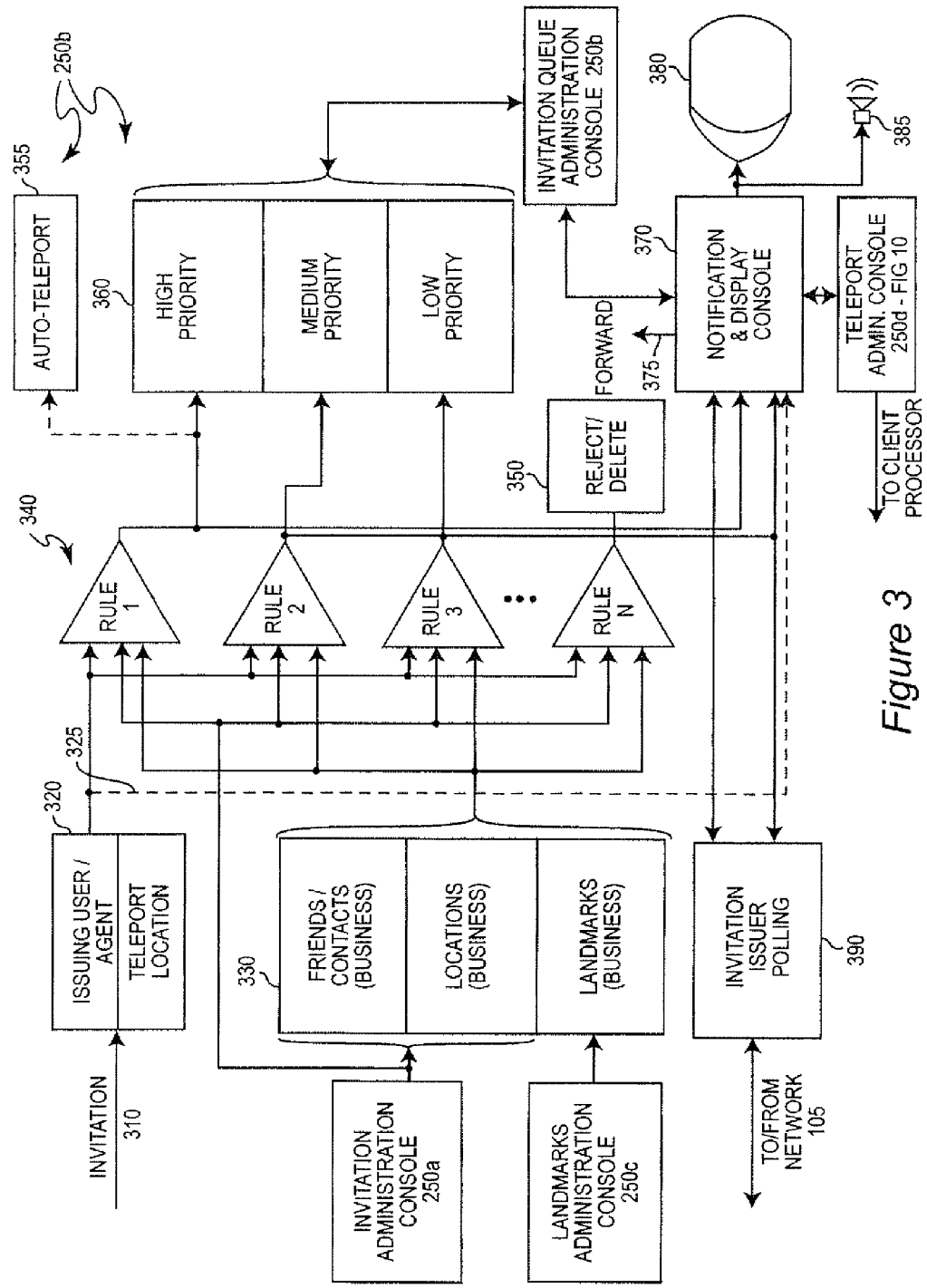
FIG. 3 is a high-level block diagram (which can also be understood as a data flow diagram) of a processing architecture useful for understanding the principles of the invention in accordance with a preferred embodiment thereof.

Referring now to FIG. 3, a high-level block diagram of the basic system of the invention is illustrated. It should be understood that the system architecture illustrated in FIG. 3 is exemplary and organized to facilitate understanding of the principles of the invention and, at the level of abstraction illustrated, can also be understood as an information flow diagram.

Figure 4A:
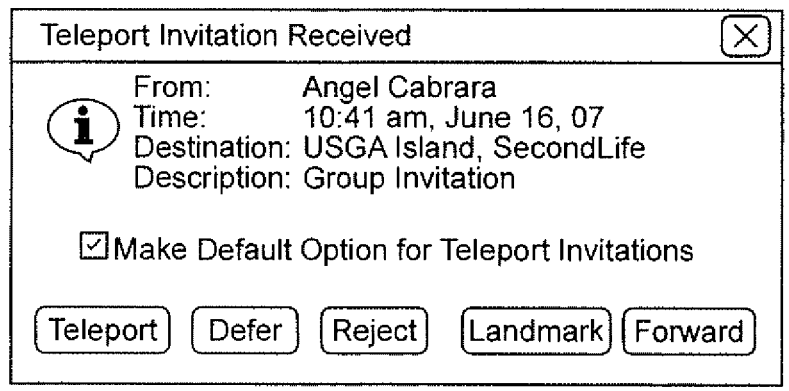
FIGS. 4A and 4B are representations of an invitation dialog window in accordance with a preferred embodiment of the invention.
Figure 4B:
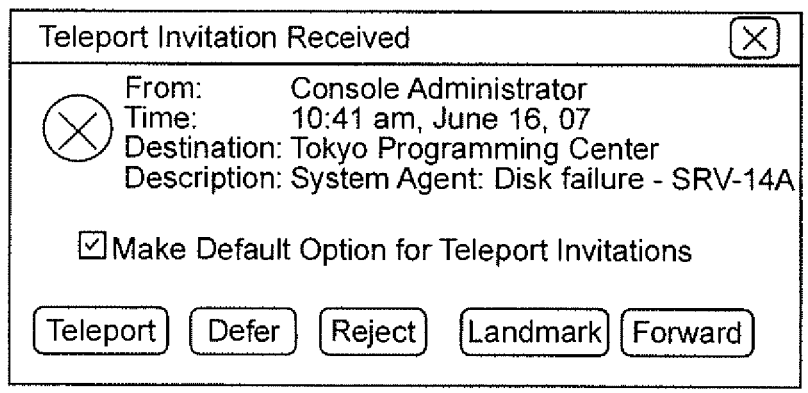

An invitation 310 specifying a user and a proposed teleportation destination is input to, for example, a register 320 arranged to receive and temporarily hold these parameters (and possibly others) of the invitation from which they may be directly displayed, if desired, in a manner similar to that illustrated in FIGS. 4A and 4B. The communication for such direct display is depicted by dashed line 325 in FIG. 3.

In accordance with a preferred embodiment of the invention, an arrangement 330 for storing user preferences for automatic invitation administration is provided. Any non-volatile storage medium (e.g. a hard drive) is suitable for the purpose. The user preferences stored therein may be regarded as user-selectable defaults since they may be changed at will and may be manipulated and/or overridden through the use of the invitation queue administration console 250b as will be discussed in greater detail below. In essence, the user may enter particular friends or contacts and potential teleportation location information into storage locations (e.g. registers or storage fields from which they are provided to logic 340 to which the current incoming invitation parameters are also provided from storage 320 in order to logically analyze the incoming invitation based on at least the sender and the proposed teleportation location. Logic 340, depicted as a comparator array for clarity and as a representation of its basic function, is intended to represent any type of logic which is capable of applying rules in accordance with user inputs to received invitation parameters and, when a particular rule is satisfied by the invitation parameters, to transfer the invitation information from storage 320 to cause immediate invitation rejection response as depicted at 350 or to defer the invitation and place it in an appropriate region of invitation queue 360.

(As a perfecting feature of the invention, a portion of the queue or an output of logic 340 can also correspond to an option of immediate and automatic teleportation for selected invitations, as depicted at 355 of FIG. 3. For example, some friends or contacts may represent parties or locations or combinations thereof to which there is a business-based obligation, such as user agreements, marketing agreements or predetermined user responsibilities, to respond immediately or within a limited period of time, as indicated by the parenthetical legend "(Business)" in partitions of storage 330. That is, as a perfecting feature of the invention, a portion of the queue or an output of logic 340 can also correspond to an option of immediate and automatic teleportation for selected invitations, as depicted at 355 of FIG. 3.)

"Business" designations can be implemented, for example, with flags on data or combinations thereof. For example, a friend/contact who might be associated with a business with which the user had business obligations may be so marked as a business friend/contact but different rules may be applied by logic 340 depending on whether the location specified in an invitation parameter in storage 320 corresponded to a location in storage 330 which was also flagged as a business location and/or if the friend/contact and location were both associated with the same business. That is, if both the friend/contact and location have "business" flags, an immediate response may be required whereas a lesser priority in queue 360 may be assigned if only one were flagged, for example, for a business contact where a non-business invitation location may indicate a social nature of the invitation. On the other hand, some locations that may be landmarked as high priority business locations may indicate a high priority is warranted or immediate response is required while other landmarks may be specified or flagged (with an alternate flag) for unconditional invitation rejection.

It should also be noted from FIG. 3 that the invitation administration rules which may be established at the will of a particular user on logic 340 through invitation administration console 250a may provide full (or any lesser degree of) flexibility to a user in the priority which will be automatically assigned to an incoming invitation. The output(s) of logic 340 may also control the type of notification, if any, provided to a user when an invitation arrives. For example, if an incoming invitation is found to satisfy rule 1 it may be identified as requiring an immediate response and a full dialogue window display as illustrated in FIG. 4A or 4B may be provided on display 380 under control of notification and display control 370. For invitations which are established by the user to be of lesser urgency, a notification of lesser intrusiveness such as a menu or button of small area may be displayed instead of a larger dialogue window or the receipt of an invitation announced with an audible indication (385) that may be varied in volume, frequency or other parameter (e.g. voice synthesis) to indicate relative urgency or lack thereof.

Such facilities provided in accordance with a preferred embodiment of the invention have special utility when teleportation invitations are sent not only from other human users of the VU but by agents, such as monitoring agents for data centers. In such cases, different aspects of, for example, a data center (e.g. cooling systems, disk drives, networks) may inundate a user with invitations related to hardware or software monitoring if connected to a VU representation. The user may wish to defer responses thereto and/or have these invitations preliminarily placed in a default or pre-specified order by the invention in connection with which various possible criteria (which may also be represented by flags or the like) in connection with the issuing agent, location or both as well as the urgency of the condition which can be indicated in the invitation by, for example, minor modification of the issuing agent or location designation such as application of an alphanumeric extension thereto which may be accommodated by different but corresponding entries in storage 330.

In this regard, it should be understood that the contents of the invitation queue can be viewed and manipulated by the user at any time by simply invoking invitation queue administration console 250*a* resulting in a display similar to that of FIG. 5 which will be discussed in greater detail below. Thus, if numerous invitations from an agent are received in a short period of time (and which may be identified as such by a distinctive audio tone or the like), the user may view the queue at any time or wait for the frequency of invitations to diminish and then view a preliminarily prioritized list of such invitations from the invitation queue 360 from which the invitations of that class which will be prioritized within a contiguous group within the queue 360 (e.g. by receipt time, urgency or the like or a combination thereof), manually reprioritize the portion of the queue or simply pick locations to which teleportation is accepted or, if, for example, a plurality of invitations are apparently urgent, forward the invitation to another user who may respond to it as depicted at 375. In this regard, invitations in the queue will be prioritized in accordance with the rules implemented in logic 340 but many sorting tools can also be provided in the invitation administration console, such as identifying a group of invitations resulting from application of a particular rule or group of rules (e.g. as may be the case of invitations received from a particular agent or group of agents) and sorting within that group of invitations based on any of a number of criteria or combinations or hierarchy thereof which may be deemed useful and which will be apparent to those skilled in the art in view of this description of the invention.

Thus, in summary, the high level steps for operation of the preferred embodiment of the invention are:

1. an invitation to teleport is received by a user/invitee;
2. the teleport invitation can be deferred (queued), accepted (for immediate teleportation), rejected/canceled, forwarded to another user or saved as a landmark (e.g. as if the user had already visited the location) for possible future reference;
3. when a queue has been formed (e.g. more than one invitation has been deferred), the user can select an option such as "accept next invitation in queue" and accept teleportation to the next invitation in the queue (which the user may do after reordering invitations manually to group teleportation invitations by area or proximity to each other or in accordance with other criteria); and
4. the user may establish preferences for how teleportation invitations are automatically prioritized and managed. In steps 3. and 4., the system provides prioritization in several different ways:
   a. manual—the user may manually alter the priority of teleport invitations either with or without automatic prioritization. That is, the user may selectively disable logic 340 and specify priority for each invitation as it is received or the logic 340 may be arranged to simply assemble the queue of invitations in the order received such that the user may manually prioritize them at a convenient later time as an alternative to manually reordering the preliminary order established by logic 340 when logic 340 is set up to express user preferences.
   b. user preference—the system can be configured, principally using logic 340, to allow users to predetermine prioritization based on the order in which the invitations were received (e.g. with oldest or most recent given highest priority), by sender (e.g. friends or business flags first), or by location (e.g. business flags or landmarks first) or a combination or ordered hierarchy of these criteria.
   c. system preference—the VU and systems contained in the VU may set the priority for an invitation based on user agreements, marketing arrangements, predetermined user responsibilities that require a particular response to a particular system event or even based on such considerations as processing loads at particular servers of the system. System preference may be implemented by setting one or more rules in logic 340 from the system rather than at the will of the user as described above. Thus, for example, when a qualifying event occurs, the user may be automatically teleported to the specified location to respond to the event (e.g. invoking auto-teleport 355). Thus the system provides for maintaining and deferring selected teleport invitations while avoiding distraction from a clutter of invitations appearing on the VU display screen as well as providing for both manual and automatic prioritization of a user's collection of invitation requests while preserving immediate notification and automatic acceptance of invitations of sufficiently high priority as determined by either the user or the system.

Invitations can be sent by any user, friends, group administrators, VU environment managers or system agents that perform event notifications. Other than for system preferences, described above, the user can choose how all of these invitations are handled from a preferably software-based invitation administration console 250*a* for setting default values for invitation alerts/notifications and priority settings. Alerts may include a pop-up dialog box, a small and unobtrusive button, any of a plurality of audible signals or no notification at all, depending on the priority initially assigned to an incoming invitation. The user can also select between teleportation options of immediate auto-teleportation 355, placing the invitation in queue 360 in a predetermined order or automatic rejection of all or selected invitations. The console 250*a* also provides the ability to set priorities among invitations in accordance with time, sender and/or location by configuration of logic 340 and/or to accept or reject invitations on the same basis.

The operation of the invention by a user will now be described to indicate the broad flexibility for deferral and administration of teleportation invitations which may be made particularly convenient by use of the preferred interface screens depicted in FIGS. 4A-10 which will be described in turn. It will also be of assistance in obtaining an appreciation of this convenience and flexibility provided in accordance with the invention to follow the state diagram provided in FIG. 11 in which the principal functionalities of the invention may be controlled by a user. It should be understood, however, that some minor functionalities and those available from known VU systems may be omitted from FIG. 11 in the interest of clarity but which are, nevertheless, depicted in the representations of the preferred interfaces. Additional facilities and functionalities will be apparent to those skilled in the art and can, of course, also be included without departing from the spirit and scope of the present invention.

If, upon receipt of an invitation (1100 of FIG. 11) the notification selected for all or selected invitations is a pop-up dialog box as depicted in FIGS. 4A and 4B (1105 and 1105' of FIG. 11) with other optional notifications (indicated, for convenience and clarity, in 1105) which differ only by an error or information icon to provide information to the user in regard to the type of invitation that has been received and whether or not an existing rule allows automatic prioritization, is presented with invitation information. Option buttons are also preferably presented which allow the user to accept the invitation (e.g. teleport immediately), defer and queue the invitation, reject the invitation, save the invitation as a landmark or forward the invitation to another user or, possibly, if the interface screen of FIG. 4B is presented, extract a new rule therefrom for prioritization of future similar invitations by, for example, conversion of the metadata of the invitation to a logical expression. This dialogue window can thus parallel the function of the invitation administration console if the user selects the indicated disposition of invitations from the same sender and location should be stored as a default. This feature of the present invention can be very useful if applied to new combinations of sender and location since it can establish a rule in logic 340 for similar invitations very quickly and with a minimum of user effort.

Figure 5:
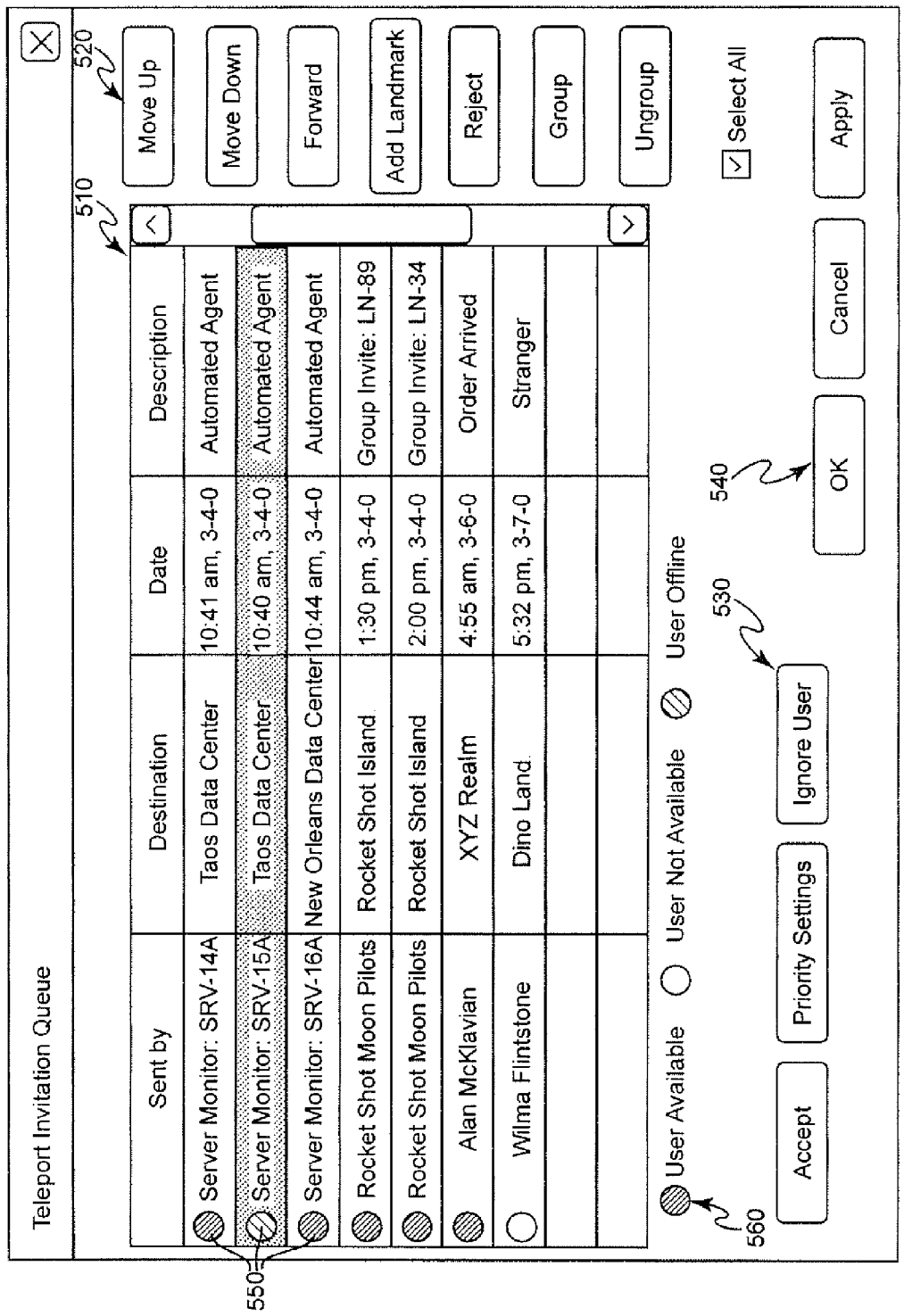
FIG. 5 is a representation of a preferred teleportation invitation queue in accordance with a preferred embodiment of the invention.

Users that elect to defer teleport invitations (1110 of FIG. 11 which will return to the stand-by state 1199 of FIG. 11) can then optionally use the invitation queue administration console 250a (1115 of FIG. 11), an exemplary interface screen for which is shown in FIG. 5, to set or modify priority of invitations in the queue represented by a sequential list 510 of received invitations. This may be performed by any suitable cursor control such as cursor keys, mouse, trackball, touch pad or the like to select a particular invitation or grouped/composite invitations and then select a disposition (e.g. move up, move down, forward, add landmark, reject, group or ungroup) using on screen buttons 520 which may be activated by a similar "Priority Settings" button among on screen buttons or the like 530 which may also be used directly to accept a similarly selected invitation or to include a particular user in rule N of FIG. 3. Other on screen buttons 540 may be used to confirm the operation so selected, to "cancel" and exit the interface screen of FIG. 5 or to "apply" the manipulation by storing the manipulation without taking action on it. To assist the user in the choice of action to be taken from this interface screen, indicia 550 and key thereto 560 are provided to inform the user of the status of the issuer of the invitation which will generally be important to the action the user wishes to take in regard to a deferred invitation.

The automatic prioritization set by the user can be overridden in situations where the user has agreed to obligations and responsibilities to respond immediately or within a limited period of time. Alternatively, such invitations may be automatically detected by settings of logic 340. Reminders to review the queue may also be included when any such invitations are stored therein by setting a time for such reminders corresponding to the required response time in notification control 370. Also, in a manner similar to the function of monitoring agents or system priorities described above, user-established priorities may also be overridden by business agents who pay a fee to VU providers to issue (e.g. high priority) invitations to locations of business agents and thus constitutes a new form of advertising model for the VU. Similarly, priorities in a user's queue could be altered by the system (e.g. by the VU system administrator or from the VU server 115) for the same purpose (e.g. a business could pay a fee to a VU provider to have its teleport invitation(s) have a higher priority than similar/competitor invitations).

The system in accordance with the present invention may also use other automatic criteria for determining invitation priority such as by automatically grouping all invitations in a particular area of the VU or by similarities of metadata or other information concerning invitation locations or senders. It is also desirable for priorities of importance to the sender to be reflected in the ordering in the queue which can be accomplished in much the same manner as setting importance flags for e-mail or in other ways which will be apparent to those skilled in the art.

During manual manipulation of the queue, a user may reject invitations by simply removing them from the queue and may also save invitations without regard to priority by removing them from the queue while creating corresponding landmarks. It is also preferred for a rejected invitation to be maintained, at least temporarily, in a rejected queue to allow them to be restored if desired or accidentally rejected. The same mechanism can be applied to return an invitation stored as a landmark to the queue 360 with any desired priority.

As shown in FIG. 5, it is desirable to inform the user of the status of the sender of an invitation in connection with use of the invitation queue administration queue console. This function may be provided by polling of queued senders as illustrated at 390 of FIG. 3 and allows the invitee to determine if the sender is not currently online or is otherwise unavailable during selection of a deferred invitation to accept. Conversely, if a sender is not available when convenient for a user to accept the invitations (e.g. over a period of time) the user may elect to reject the invitation.

It is desirable that the user be able to select a "next teleport" option to teleport the user's avatar to the highest priority teleport destination location in the invitation queue or in a group of grouped/composite invitations at virtually any time during the VU session. However, it is important that the state of the queue not be in any way ambiguous and therefore that option is preferably not provided on the invitation administration console if any such ambiguity is possible. Rather, this operation is depicted at 1120 of FIG. 11 as being entered from the stand-by state 1199; a state where no other operations are in process. However, such an operation could be entered from virtually any other state depicted in FIG. 11.

Figure 6:
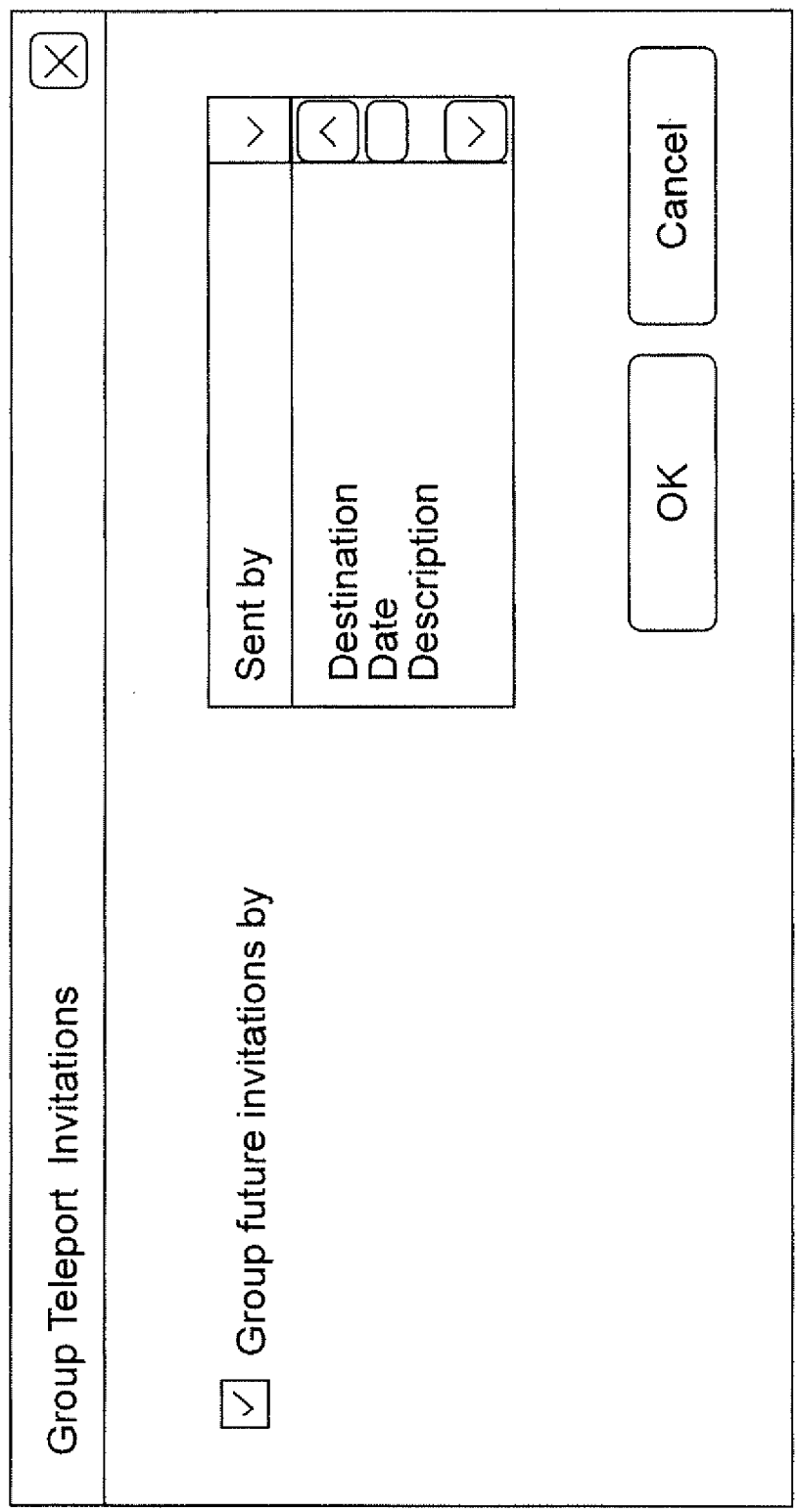
FIG. 6 is a preferred dialog box or interface screen for controlling grouping of teleport invitations.
Figure 9:
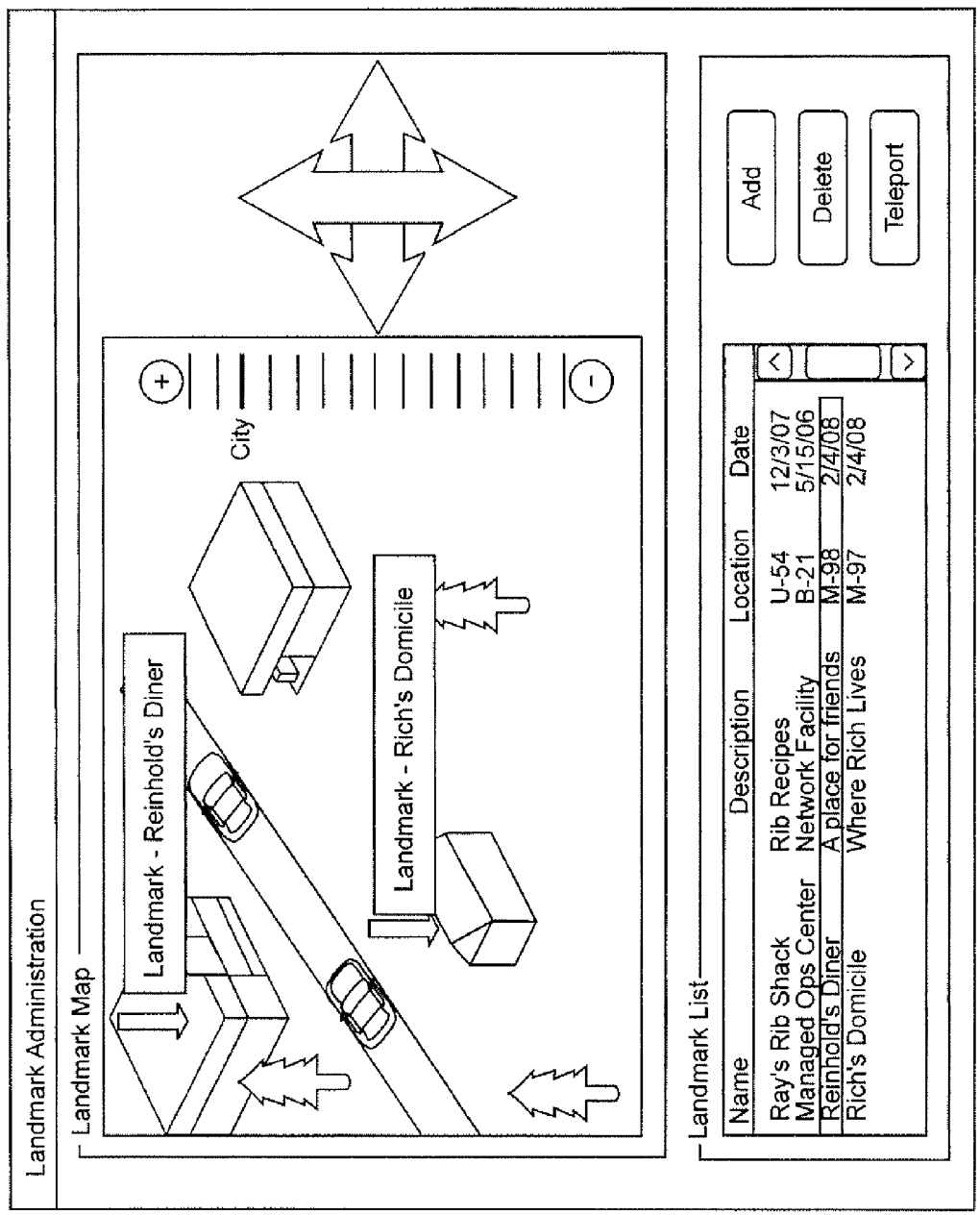
FIG. 9 is a preferred landmark administration console interface screen.

The invention as described above including the invitation administration console of FIG. 5 may also be used to facilitate the creation of composite teleports which may share a common sender, location of degree of similarity of theme, topic, subject or description as may be indicated in, for example, metadata regarding a sender, location or objects located at respective locations. Such a manipulation of groups may be initiated from the group and ungroup buttons among buttons 520 or the like which invokes a interface screen or pop-up dialog box, a preferred form of which is illustrated in FIG. 6 (1125 of FIG. 11) to provide criteria which may be applied to metadata of invitations to establish groups. Criteria for grouping may be thus be changed at will and at any time, causing the existing groups to be selectively reconstituted or eliminated. Ungrouping may be performed on a selected invitation basis from the interface screen of FIG. 5, as well.

Such composite teleports as can be easily and conveniently established through the interface screen of FIG. 6 may be of particular utility in allowing a user or the system to group multiple locations or invitations thereto within a single invitation and allowing them to be administered as a group. For example, a plurality of separate locations related to system monitoring work can be segregated from other types of invitations under a single heading as a composite teleport and administered together (e.g. as a sub-list). This function is somewhat similar to grouping priority of locations which are geographically proximate to each other alluded to above, but forms a more cohesive grouping of teleports as a single composite teleport which can be visited with only a single teleportation. That is, composite teleports that contain more than one location can be visited based on priority or individually. For example, a composite teleport may contain six total invitations which include three different locations. If the user chooses to teleport to that composite list, the priority list would be checked and the teleport invitations in that list would be accepted in order (e.g. first in, first out). Thus the composite teleport as provided by the present invention facilitates grouping and manipulating invitations from an administration perspective such that a large number of invitations with common features (e.g. from the same issuer and location) can be manipulated as a single invitation and avoids, for example, a need to scroll through possibly many pages to access or view, for example, the oldest or most recent among them. Another particularly convenient application of this perfecting feature of the invention is to form a composite teleport based on invitations from particular friends which can then be accepted when all or a majority of those friends are available as may be determined visually from indicia provided on the invitation administration console screen as described above and illustrated in FIG. 5 by colored indicia/icons and legends.

It should be noted that the invention and particularly the perfecting feature of forming composite teleports has particular application in regard to, for example, a virtual data center that represents a real data center in which various parts of the data center may be issuing invitations to teleport. Thus, rather than distracting the user with numerous invitations, the invitations may simply be collected under a single composite teleport invitation. In such circumstances, the invention provides a powerful invitation management tool for reducing the effective number of invitations to be managed while effectively retaining them (e.g. without the necessity of rejecting any) while allowing the user substantial convenience in organizing, segregating and establishing priority (e.g. providing triage) for sites the user may have responsibility to oversee.

Figure 7:
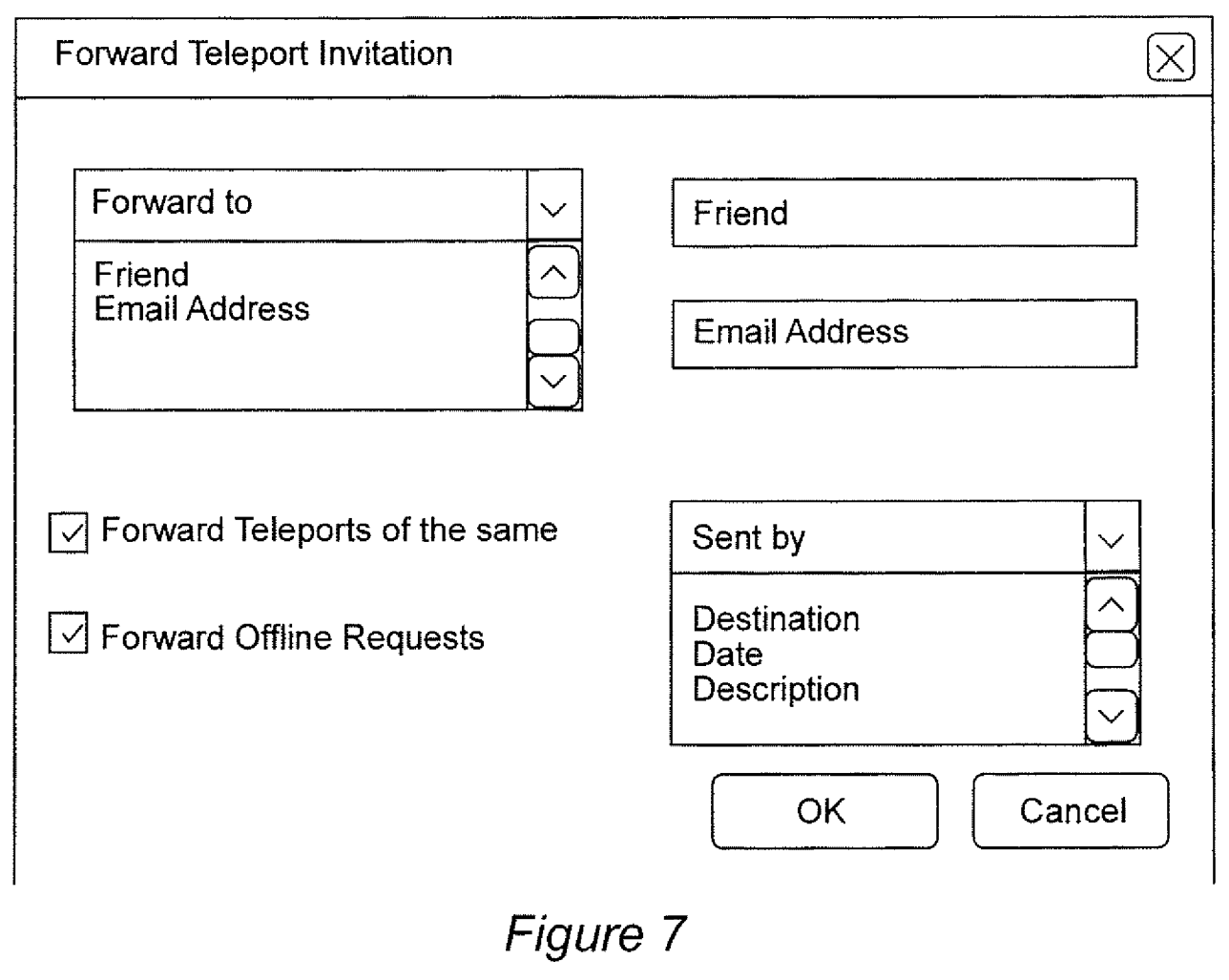
Figure 11:
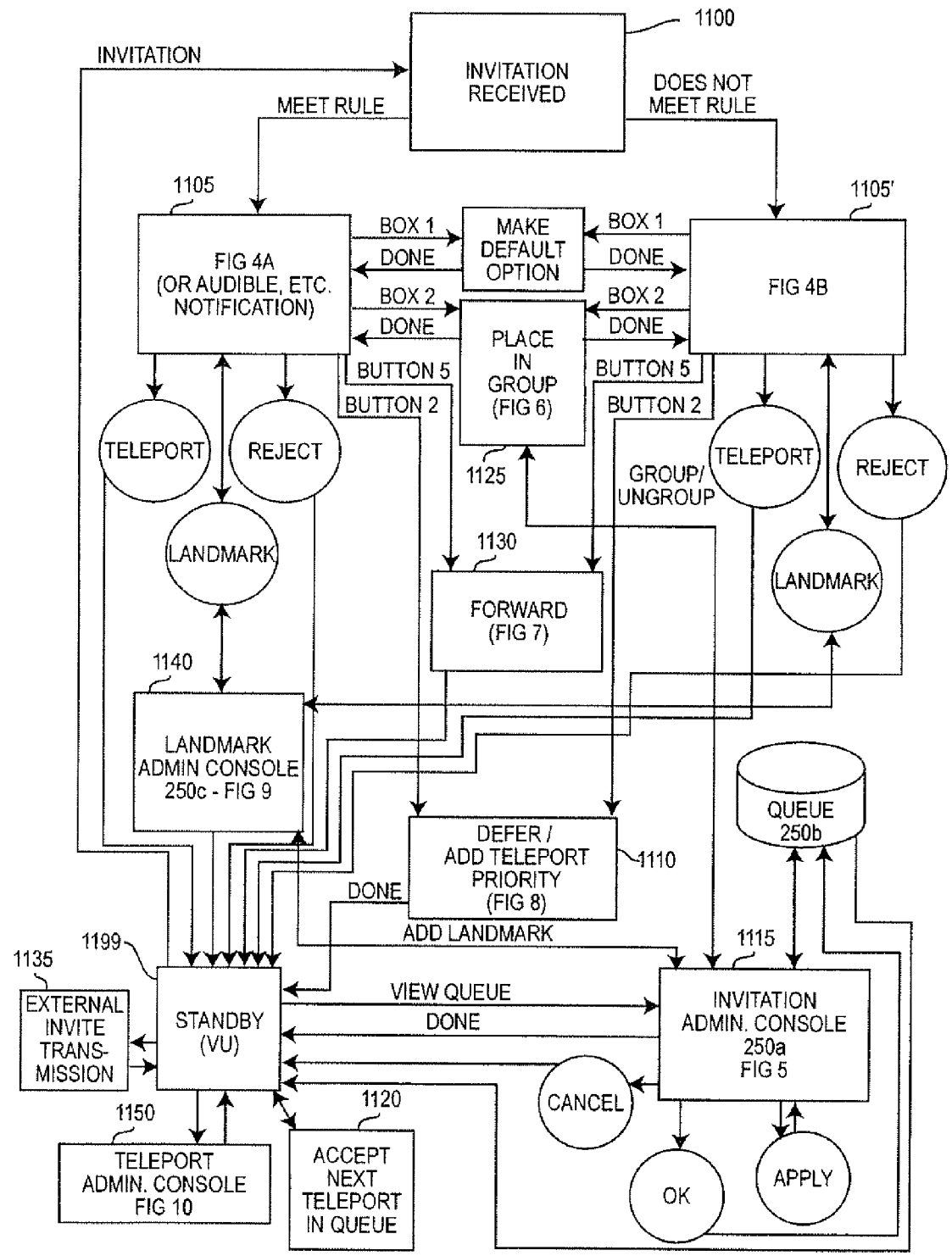
FIG. 11 is a state diagram useful for conveying an understanding of the operation of a preferred embodiment of the invention in accordance with its basic principles and the interrelationship of the interface screens or dialog boxes of FIGS. 4-10.

Conversely, teleports and composite teleports in particular, may be split through the facilities and functionality provided by the invention by providing automatic forwarding or designating an alternative recipient if the primary designated recipient is unavailable in a simple and expeditious manner through use of a forward teleport invitation interface screen; a preferred form of which is illustrated in FIG. 7 (1130 of FIG. 11). Splitting may be accomplished automatically through use of a policy table resident at the sender which supplies alternative recipients, or at the recipient, either manually or under control of logic 340 as may also be specified through use of the interface screen of FIG. 7.

Another perfecting feature of the invention not necessary to its successful practice in accordance with its basic principles is a facility for specifying new rules, particularly where the user is notified through display of the notification of FIG. 4B that the invitation does not match a currently existing prioritization rule. The defer button (button 2) in either of FIG. 4A or 4B invokes an "add new teleport priority" interface screen such as that of FIG. 8 (1110 of FIG. 11, alluded to above). This screen provides a convenient format to inform the user of the criteria on which prioritization may be based and is not limited to those explicitly illustrated, as indicated by inclusion of menu controls which also provide substantial user convenience.

An additional perfecting feature deemed to be within the scope of the present invention is the transmission of invitation queue information outside the VU as depicted at 1135 of FIG. 11. For example, when a user logs off the VU with invitations in the queue, the invitations may be sent as text messages to the e-mail service on the same processor or even transmitted to a remote terminal such as a wireless personal digital assistant (PDA) or other wireless messaging device. Such messages may contain textual information associated with each invitation such as the name of the sender and the time sent and may optionally contain hyperlinks to information which may be accessed other than through the VU.

Yet another perfecting feature of the invention which may be invoked from either of the screens of FIG. 4A or 4B is the creation of a landmark from an invitation. This function is preferably facilitated by provision of a landmark administration console such as that depicted in FIG. 9. Such a console may be provided in known VU systems in which landmarks can be established or specified at will. However, the invention provides for this function to be invoked after the user has been informed of the existence or non-existence of prioritization rules and in a manner entirely consistent with the other interface facilities in accordance with the invention and vice-versa.

Figure 10:
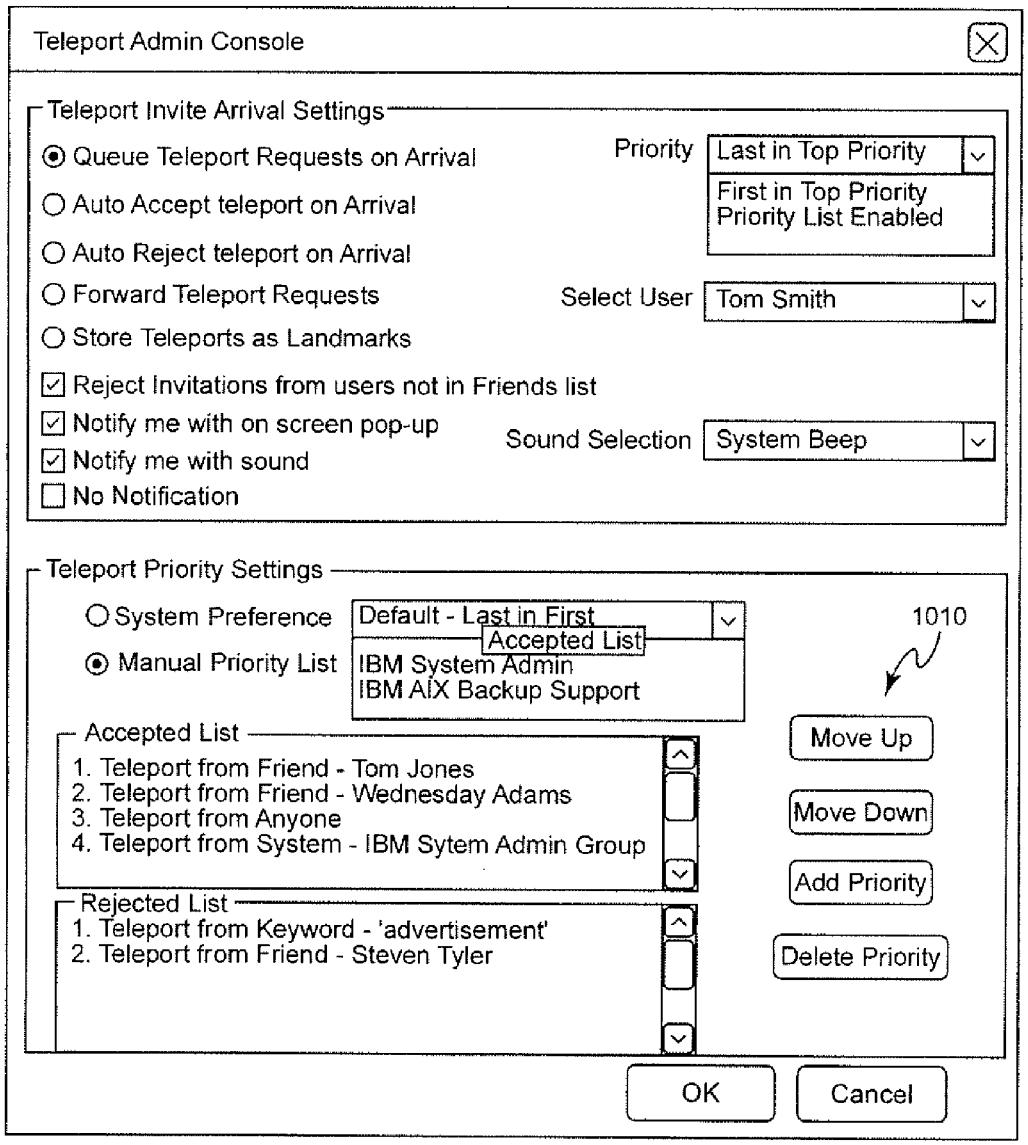
FIG. 10 is a preferred teleport administration console for setting automatic invitation acceptance/rejection, user notification and prioritization defaults.

User-defined defaults which will be embodied in the prioritization rules 340 are preferably entered into the invention by a facility such as that provided by a teleport administration console such as that depicted in FIG. 10 (1150 of FIG. 11). The upper portion of the interface screen allows the user to establish certain desired treatments of teleport invitations upon arrival. The first of these options fully invoke the prioritization functionality of the invention described above to provide at least temporary deferral of all invitations including the capability of selectively accepting or rejecting them automatically based on established rules 340 or in accordance with the treatment instructions solicited from the user beginning with FIG. 4B as discussed above. Otherwise, the user may establish that all invitations should be accepted, rejected, forwarded or landmarked upon arrival. A substantial degree of selectivity may also be provided through menus and control boxes in regard to a default priority to be assigned, the user(s) from whom invitations are to be accorded that priority and the medium of notification (e.g. audible or visual notifications in regard to particular metadata of invitations). The lower portion of the interface screen allows for setting of relative priority between system preferences and manual default settings and the development of lists of criteria embodied in respective ones of rules 340. The order of priority for each list can be edited from a partial listing of invitations to be accepted (accepted list) through on-screen button 1010 or the like.

In view of the foregoing, it is seen that the invention provides a system which can enhance the VU experience of a user by greatly reducing distraction due to notifications of teleportation invitations while allowing deferral of responses thereto and providing and facilitating management of invitations. A preliminary prioritization of invitations may be automatically provided at the will of the user and which can be manually refined at the convenience of the user. Flexibility and additional functionality of the important VU function of issuing and responding to teleportation invitations is thus achieved.

Figure 12:
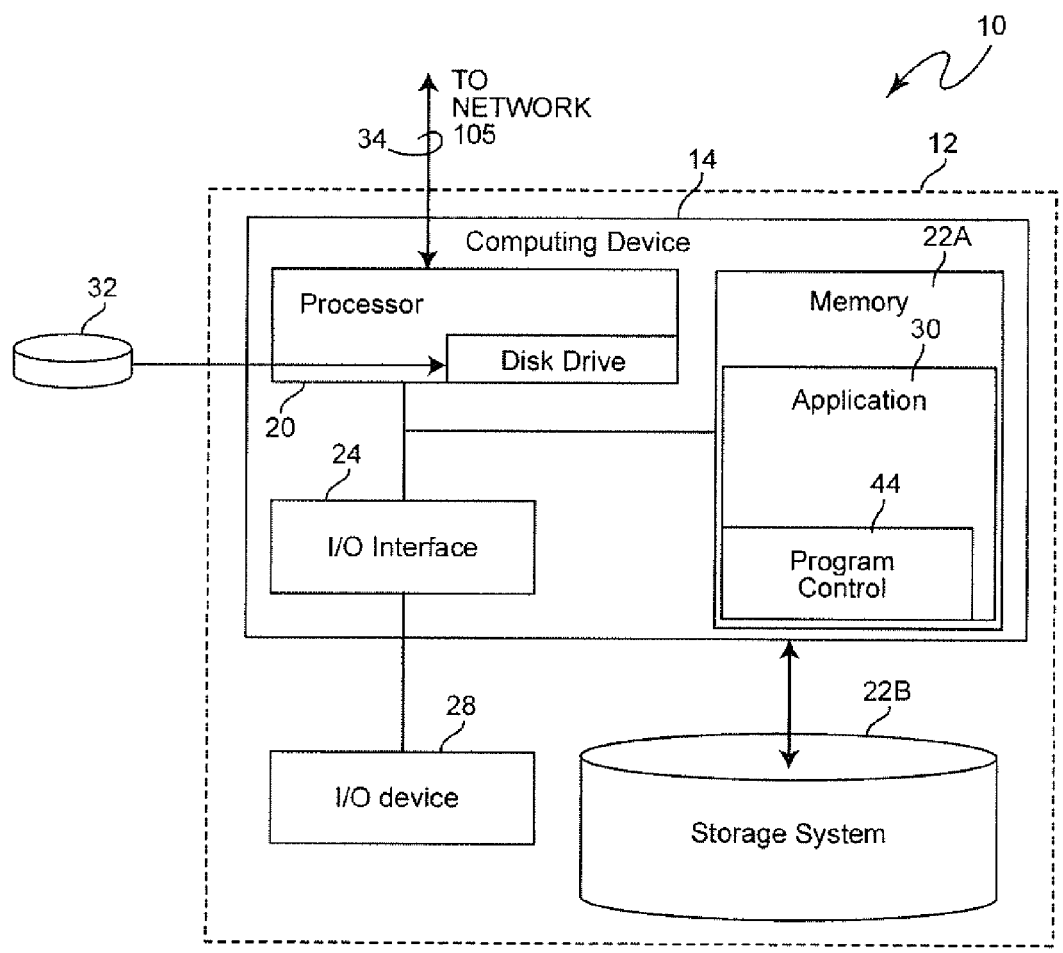
FIG. 12 illustrates a suitable processor architecture for use as a server or client in FIG. 1.

While shown and described herein as a method and a system, it is understood that the invention further provides various alternative embodiments. For example, in one embodiment shown in FIG. 12, the invention provides a computer-readable/useable medium 22B that includes computer program code to enable a computer infrastructure to automatically manage teleportation movements between locations in virtual environments while determining suitability of requested destinations. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc., collectively depicted at 32), or on one or more data storage portions of a computing device, such as the memory 22A and/or the storage system 22B (e.g., a fixed disk, a read-only memory, a random access memory, a cache memory, etc.), and/or as a data signal 34 (e.g., a propagated signal) traveling over a network 105 as depicted in FIG. 1 (e.g., during a wired/wireless electronic distribution of the program code).

Still yet, computer infrastructure 10 is intended to demonstrate that some or all of the components of implementation could be deployed, managed, serviced, etc. by a service provider who offers to implement, deploy, and/or perform the functions of the present invention for automatically managing teleportation movements between locations in virtual environments while determining suitability of requested destinations, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure 12 including computing device 14, such as the computer infrastructure 10 that performs the process steps of the invention for automatically manage teleportation movements between locations in virtual environments while determining suitability of requested destinations, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of an application 30 comprising a set of instructions including program control 44 intended to cause a computing device 20 having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver 24 for a particular computing and/or I/O device 28, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

While the invention has been described in terms of a single preferred embodiment, those skilled in the art will recognize that the invention can be practiced with modification within the spirit and scope of the appended claims.

What is claimed is:

1. A method of managing teleportation invitations in a virtual universe, said virtual universe being a computer-based simulated environment having locations therein intended for users to inhabit and interact through the use of avatars and within and between which an avatar can move by teleportation, said method comprising:
    logically analyzing, by computer, incoming teleportation invitations on the basis of at least the sender and proposed teleportation location;
    responsive to results of said logically analyzing step, automatically performing for each teleportation invitation one of:
        accepting the teleportation invitation for teleporting in accordance with said teleportation invitation,
        rejecting the teleportation invitation, and
        deferring response to the teleportation invitation by placing the teleportation invitation in a queue at a queue location having a priority for possible acceptance within said queue based on said logically analyzing step,
        wherein one or more of the incoming teleportation invitations are deferred and placed in said queue; and
    teleporting the avatar of a user to the proposed teleportation location of at least one deferred teleportation invitation in said queue, said proposed teleportation location being a geographical location within the topology of a virtual universe,
    wherein avatars are graphical representations for traversing and interacting within one or more virtual universes.

2. The method as recited in claim 1 wherein said logically analyzing step is performed based on rules in regard to metadata corresponding to at least an issuer of the invitation and a destination of the teleportation invitation.

3. The method as recited in claim 2 wherein said rules are created based on metadata in a teleportation invitation.

4. The method as recited in claim 3 wherein a rule specifies how a user is alerted to receipt of a teleportation invitation.

5. The method as recited in claim 1, wherein a landmark is selectively created in response to results of said logically analyzing step or by user manipulation of said queue.

6. The method as recited in claim 1, further including altering order of teleportation invitations or controlling grouping of teleportation invitations in said queue by a user.

7. The method as recited in claim 1, further including indicating availability status of issuers of respective teleportation invitations in said queue.

8. A computer program product comprising a computer readable medium storing non-transitory signals comprising a computer program, said computer program, when run on a computer hosting a virtual universe, said virtual universe being a computer-based simulated environment having locations therein intended for users to inhabit and interact through the use of avatars and within or between which an avatar can move by teleportation, causing said computer to perform:
 logically analyzing, using said computer, incoming teleportation invitations on the basis of at least the sender and proposed teleportation location;
 responsive to results of said logically analyzing step, automatically performing for each teleportation invitation one of:
  accepting the teleportation invitation for teleporting in accordance with said teleportation invitation,
  rejecting the teleportation invitation, and
  deferring response to the teleportation invitation by placing the teleportation invitation in a queue at a queue location having a priority for possible acceptance within said queue based on said logically analyzing step,
  wherein one or more of the incoming teleportation invitations are deferred and placed in said queue; and
 teleporting the avatar of a user to the proposed teleportation location of at least one deferred teleportation invitation in said queue, said proposed teleportation location being a geographical location within the topology of a virtual universe,
 wherein avatars are graphical representations for traversing and interacting within one or more virtual universes.

9. The computer program product as recited in claim 8 wherein said logically analyzing step is performed based on rules in regard to metadata corresponding to at least an issuer of the teleportation invitation and a destination of the teleportation invitation.

10. The computer program product as recited in claim 9 wherein said rules are created based on metadata in a teleportation invitation.

11. The computer program product as recited in claim 10 wherein a rule specifies how a user is alerted to receipt of a teleportation invitation.

12. The computer program product as recited in claim 8, wherein a landmark is selectively created in response to results of said logically analyzing step or by user manipulation of said queue.

13. The computer program product as recited in claim 8, wherein said program further causes the computer to perform:
 altering order of teleportation invitations or controlling grouping of teleportation invitations in said queue by a user.

14. The computer program product as recited in claim 8, wherein said program causes the computer to perform the further step of indicating status of issuers of respective teleportation invitations in said queue.

15. A virtual universe system, said virtual universe system providing a virtual universe to users thereof, said virtual universe being a computer-based simulated environment having locations therein intended for users to inhabit and interact through the use of avatars and within or between which an avatar can move by teleportation, said virtual universe system including
 comparison means to compare, by computer, metadata in a teleportation invitation to a plurality of rules,
 storage for containing a queue of said teleportation invitations which are neither automatically accepted nor rejected based on said rules in a controllable priority order for possible acceptance,
 means for storing a teleportation invitation in said queue with a priority determined in accordance with a rule of said plurality of rules,
 means for manipulating said priority order of teleportation invitations stored in said queue, accepting a teleportation invitation stored in said queue or rejecting a teleportation invitation stored in said queue whereby a response to a teleportation invitation may be deferred, and
 means for teleporting the avatar of a user to a proposed teleportation location of at least one deferred teleportation invitation in said queue, said proposed teleportation location being a geographical location within the topology of said virtual universe,
 wherein avatars are graphical representations for traversing and interacting within said virtual universe.

16. The virtual universe system as recited in claim 15, wherein a rule of said plurality of rules specifies how a user is notified of receipt of a teleportation invitation.

17. A method of advertising using a virtual universe system, said virtual universe system providing a virtual universe to users thereof, said virtual universe being a computer-based simulated environment having locations therein intended for users to inhabit and interact through the use of avatars and within or between which an avatar can move by teleportation including
 logically analyzing, using a computer, a teleportation invitation in accordance with a rule;
 deferring response to said teleportation invitation by storing said teleportation invitation which is neither automatically accepted nor automatically rejected in accordance with a rule in a queue with a priority for possible acceptance specified in said rule from said virtual universe system and independently of a user; and
 teleporting the avatar of a user to a proposed teleportation location of at least one deferred teleportation invitation in said queue, said proposed teleportation location being a geographical location within the topology of said virtual universe,
 wherein avatars are graphical representations for traversing and interacting within said virtual universe.

18. A method of operating a virtual universe (VU) system on a plurality of networked data processors, said virtual universe system providing a virtual universe to a user thereof, said virtual universe being a computer-based simulated environment having locations therein intended for users to inhabit and interact through the use of avatars and within or between which an avatar can move by teleportation, said method comprising configuring at least one data processor of said plurality of data processors to provide
 comparison means to compare, using said at least one processor, metadata in a teleportation invitation to a plurality of rules,
 storage for containing a queue of said teleportation invitations, means for storing a teleportation invitation which is neither automatically accepted nor automatically rejected in accordance with said rule in said queue with a priority for possible acceptance determined in accordance with a rule of said plurality of rules, means for manipulating said priority of teleportation invitations stored in said queue, accepting a teleportation invitation stored in said queue and teleporting in accordance with said teleportation invitation or rejecting a teleportation invitation stored in said queue whereby a response to a teleportation invitation may be deferred, and means for teleporting the avatar of a user to a proposed teleportation location of at least one deferred teleportation invitation in said queue, said proposed teleportation location being a geographical location within the topology of said virtual universe, wherein avatars are graphical representations for traversing and interacting within said virtual universe.

19. A virtual universe system, said virtual universe system providing a virtual universe to users thereof, said virtual universe being a computer-based simulated environment having locations therein intended for users to inhabit and interact through the use of avatars and within or between which an avatar can move by teleportation, said virtual universe system including comparison means to compare metadata in a teleportation invitation to a plurality of rules, storage for containing a queue of said teleportation invitations in a controllable priority order for possible acceptance, means for storing a teleportation invitation in said queue with a priority determined in accordance with a rule of said plurality of rules, means for manipulating said priority order of teleportation invitations stored in said queue, accepting a teleportation invitation stored in said queue or rejecting a teleportation invitation stored in said queue whereby a response to a teleportation invitation may be deferred, and polling means for determining status of issuers of respective teleportation invitations in said queue and displaying said status to a user.

20. A virtual universe system, said virtual universe system providing a virtual universe to users thereof, said virtual universe being a computer-based simulated environment having locations therein intended for users to inhabit and interact through the use of avatars and within or between which an avatar can move by teleportation, said virtual universe system including comparison means to compare metadata in a teleportation invitation to a plurality of rules, storage for containing a queue of said teleportation invitations in a controllable priority order for possible acceptance, means for storing a teleportation invitation in said queue with a priority determined in accordance with a rule of said plurality of rules, means for manipulating said priority order of teleportation invitations stored in said queue, accepting a teleportation invitation stored in said queue or rejecting a teleportation invitation stored in said queue whereby a response to a teleportation invitation may be deferred, and means for converting a teleportation invitation to form a rule of said plurality of rules.

21. A virtual universe system, said virtual universe system providing a virtual universe to users thereof, said virtual universe being a computer-based simulated environment having locations therein intended for users to inhabit and interact through the use of avatars and within or between which an avatar can move by teleportation, said virtual universe system including comparison means to compare metadata in a teleportation invitation to a plurality of rules, storage for containing a queue of said teleportation invitations in a controllable priority order for possible acceptance, means for storing a teleportation invitation in said queue with a priority determined in accordance with a rule of said plurality of rules, and means for manipulating said priority order of teleportation invitations stored in said queue, accepting a teleportation invitation stored in said queue or rejecting a teleportation invitation stored in said queue whereby a response to a teleportation invitation may be deferred, wherein a rule of said plurality of rules is specified from said virtual universe system independently of user action.

* * * * *